(12) United States Patent
Lin (10) Patent No.: US 7,586,743 B2
(45) Date of Patent: Sep. 8, 2009

(54) PORTABLE ELECTRONIC APPARATUS WITH ADJUSTABLE DISPLAY PANEL

(75) Inventor: Chun-Wang Lin, Taipei County (TW)

(73) Assignee: Quanta Computer, Inc., Tao Yuan Shien (TW)

( * ) Notice: Subject to any disclaimer, the term of this patent is extended or adjusted under 35 U.S.C. 154(b) by 101 days.

(21) Appl. No.: 11/987,622

(22) Filed: Dec. 3, 2007

(65) Prior Publication Data

US 2009/0040701 A1    Feb. 12, 2009

(30) Foreign Application Priority Data

Aug. 10, 2007    (TW) .............................. 96129589 A (51) Int. Cl.
*G06F 1/16* (2006.01)
(52) U.S. Cl. ................................. 361/679.55
(58) Field of Classification Search ............ 361/679.55, 361/679.56
See application file for complete search history.

(56) References Cited

U.S. PATENT DOCUMENTS 5,168,426 A * 12/1992 Hoving et al. .......... 361/679.09
5,200,913 A * 4/1993 Hawkins et al. ........ 361/679.09
6,219,681 B1 * 4/2001 Hawkins et al. ........ 361/679.27
6,903,927 B2 * 6/2005 Anlauff .................. 361/679.28
7,068,496 B2 * 6/2006 Wong et al. ............ 361/679.28
7,184,263 B1 * 2/2007 Maskatia ................ 361/679.27
7,280,348 B2 * 10/2007 Ghosh .................... 361/679.27

* cited by examiner

*Primary Examiner*—Lisa Lea-Edmonds
(74) *Attorney, Agent, or Firm*—Stites & Harbison, PLLC; Juan Carlos A. Marquez, Esq.

(57) ABSTRACT

The invention discloses a portable electronic apparatus with an adjustable display panel. The portable electronic apparatus uses a retained portion cooperated with a plurality of retaining portions (like a recess) to support the display panel. Thereby, the display panel of the portable electronic apparatus can be adjusted to a plurality of angles so as to adapt to real conditions, such as angles of light source, operational behaviors of users and the like, which further enhances the utility of the portable electronic apparatus. Furthermore, because the supporting force offered by the retained portion cooperated with the retaining portions is greater than a pressing force generated as a user operates the display panel, the display panel can remain steady when the user operates the display panel.

13 Claims, 8 Drawing Sheets

PORTABLE ELECTRONIC APPARATUS WITH ADJUSTABLE DISPLAY PANEL

BACKGROUND OF THE INVENTION

1. Field of the Invention

The invention relates to a portable electronic apparatus, and more particularly, to a portable electronic apparatus with an adjustable display panel.

2. Description of the Prior Art

Some kinds of portable electronic apparatus with touch display panel allow a user to input data by using a touch pen to operate a portable electronic apparatus, such as a tablet computer or a PDA. When using these kinds of portable electronic apparatus, the display panel of which can be lain on and parallel to the housing so as to allow the user to hold with one hand and operate the display panel with another hand to input data.

However, if the display panel of the portable electronic apparatus is parallel to the hosing and the angle corresponsive to the housing can not be adjusted, the display panel will be influenced by the angles of light sources so as to cause the user unable to see the content of the display clearly as the light sources are improper. In addition, inputting data by touching often has a defect of inputting the data slowly.

Accordingly, one scope of the invention is to provide a portable electronic apparatus with an adjustable display panel to solve the foregoing problems.

SUMMARY OF THE INVENTION

Accordingly, one scope of the invention is to provide a portable electronic apparatus with an adjustable display panel. The portable electronic apparatus uses a retained portion cooperated with a plurality of retaining portions (like a recess) to support the display panel. Thereby, the display panel of the portable electronic apparatus can be adjusted to a plurality of angles so as to adapt to real conditions, such as angles of light source, operational behaviors of users and the like, which further enhances the utility of the portable electronic apparatus.

The portable electronic apparatus according to a preferred embodiment of the invention includes a housing, a display panel, a first sleeve, a first hollow member, a firs push bar, and a user-operable activating member.

A bottom edge of the display panel is slidably engaged to a top portion of the housing. A tail end of the first sleeve is pivotally engaged to the top portion of the display panel. The first sleeve therein provides N first retaining portions, and N is an integer larger than 1. The first hollow member is pivotally engaged to a rear portion of the display panel and adapted to be inserted into the first sleeve from an open end thereon. The first push bar is inserted through and rotatably mounted in the first hollow member. The first push bar has a first pushed portion exposed outside the first hollow member, and has a first retained portion disposed inside the first sleeve and retained by one of the first retaining portions. The user-operable activating member is movably mounted on the rear portion of the display panel.

When the user-operable activating member is operated to activate the first pushed portion of the first push bar, the first retained portion escapes from the one first retaining portion, and the display panel is operated to rotate and lift or lower with respect to the housing. Then, the activating member is turned back so that the first retained portion is retained by another one of the first retaining portions.

Moreover, because the supporting force provided by the retained portion and the retaining portions is larger than the pressing force generated by a user while operating display panel, the retained portion and the retaining portions is capable of supporting the display panel firmly during operation; as a result, the user operates conveniently. Furthermore, because the user only has to operate knobs to adjust the angle of the display panel easily without complex operation processes, it is convenient to the user.

The advantage and spirit of the invention may be understood by the following recitations together with the appended drawings.

DETAILED DESCRIPTION OF THE INVENTION

Figure 1:
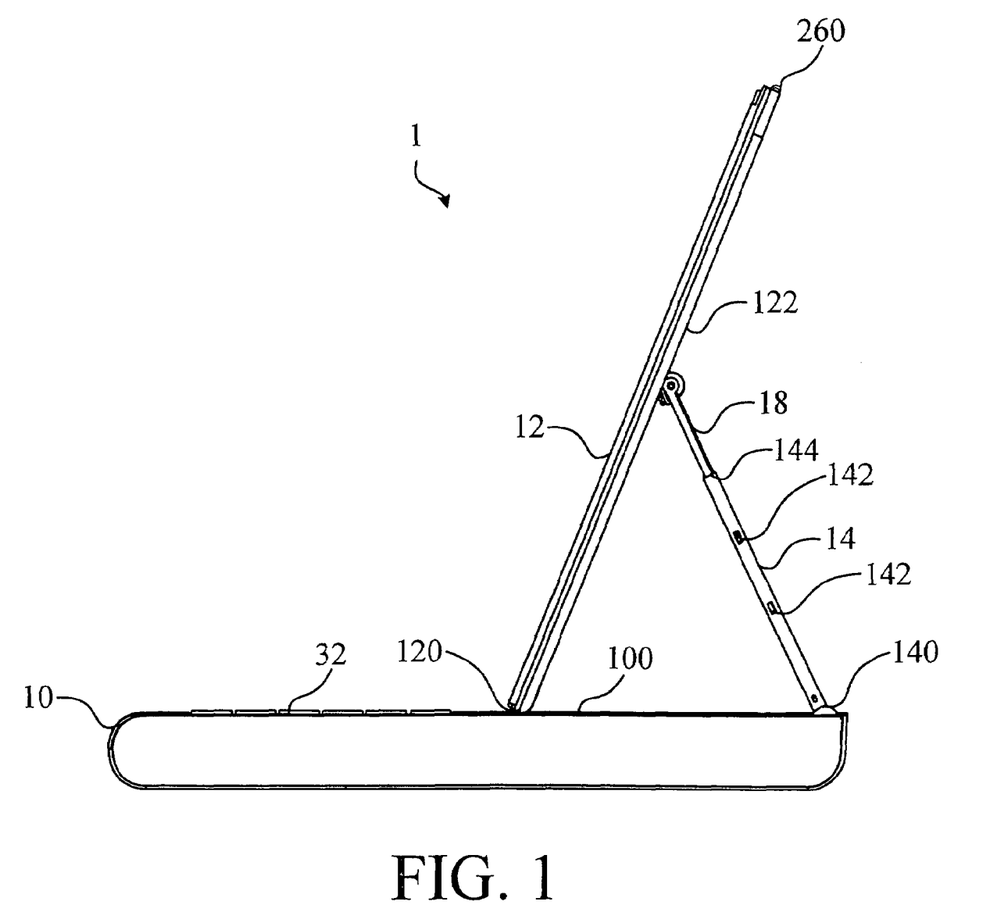
FIG. 1 is a side view illustrating a portable electronic apparatus of a preferred embodiment of the invention.
Figure 2:
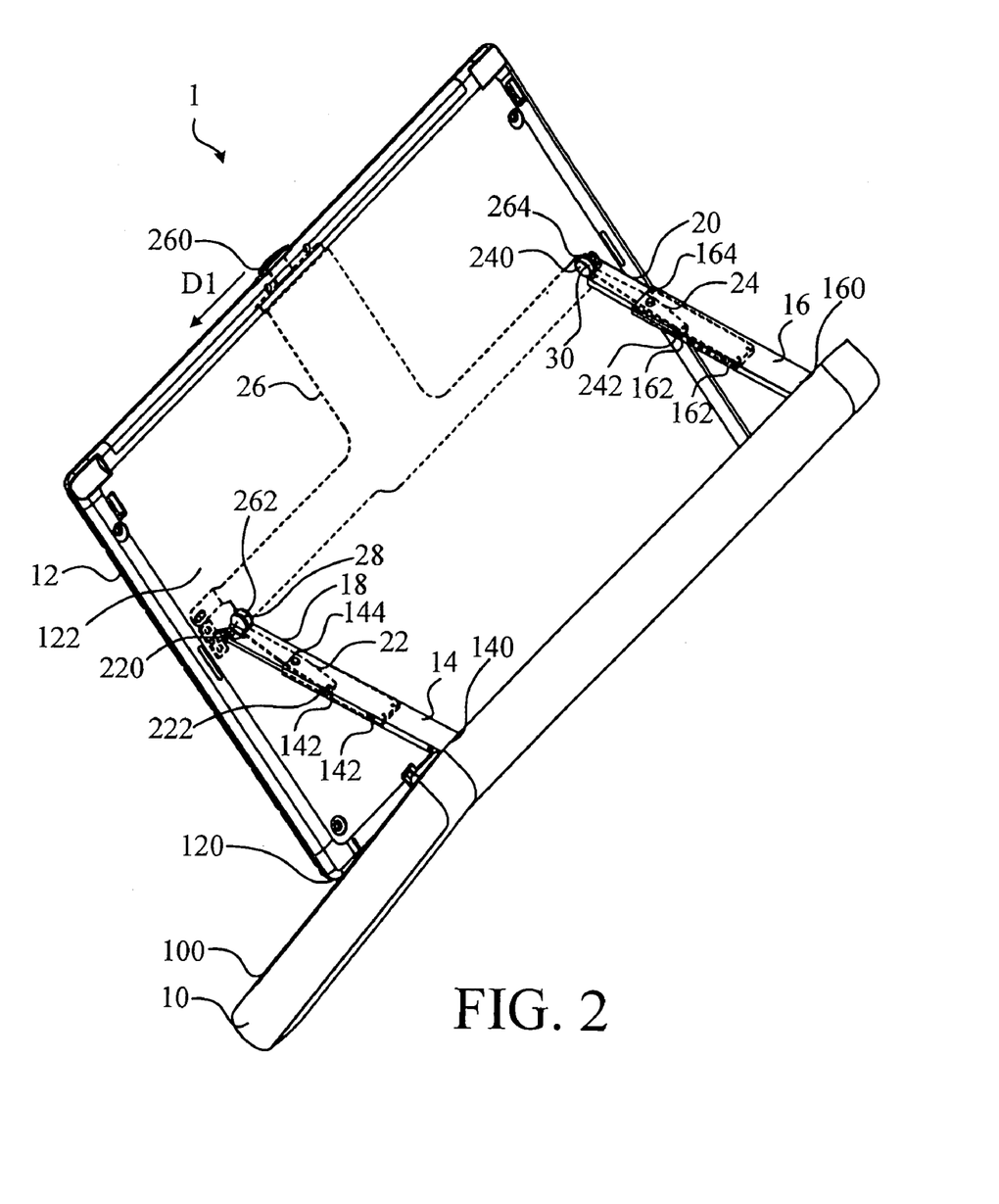
FIG. 2 is an isometric view illustrating the portable electronic apparatus in FIG. 1.

Please refer to FIG. 1 and FIG. 2. FIG. 1 is a side view illustrating a portable electronic apparatus 1 of a preferred embodiment of the invention. FIG. 2 is an isometric view illustrating the portable electronic apparatus 1 in FIG. 1. As shown in FIG. 1 and FIG. 2, the portable electronic apparatus 1 of the invention includes a housing 10, a display panel 12, a first sleeve 14, a second sleeve 16, a first hollow member 18, a second hollow member 20, a first push bar 22, a second push bar 24, and a user-operable activating member 26. It is notable that the portable electronic apparatus 1 of the preferred embodiment adopts two set of sleeves, hollow members, and push bars for increasing the stability of the display panel 12, but it is not limited to this. In a practical application, the portable electronic apparatus 1 of the invention can only include one sleeve, one hollow member, and one push bar, which all depends on the practical application of designers.

In the embodiment, a bottom edge 120 of the display panel 12 is slidably engaged to a top portion 100 of the housing 10. A tail end 140 of the first sleeve 14 and a tail end 160 of the second sleeve 16 are pivotally engaged to the top portion 100 of the housing 10 respectively.

As shown in FIG. 1 and FIG. 2, the first sleeve 14 therein provides N first retaining portions 142, and N is an integer larger than 1. The second sleeve 16 therein provides N second retaining portions 162. Each of the second retaining portions 162 corresponds to one of the first retaining portions 142.

In a practical application, each of the first retaining portions 142 is a recess formed in the first sleeve 14, and the first retaining portions 142 are made into, but not limited to, a form of a rack. Similarly, the second retaining portions 162 are the same as the first retaining portions 142 and is not to be described herein again.

In the embodiment, the first hollow member 18 can be pivotally engaged to a rear portion 122 of the display panel 12 and adapted to be inserted into the first sleeve 14 from an open end 144 thereon. Similarly, the second hollow member 20 can be pivotally engaged to the rear portion 122 of the display panel 12 and adapted to be inserted into the second sleeve 16 from an open end 164 thereon.

Figure 3A:
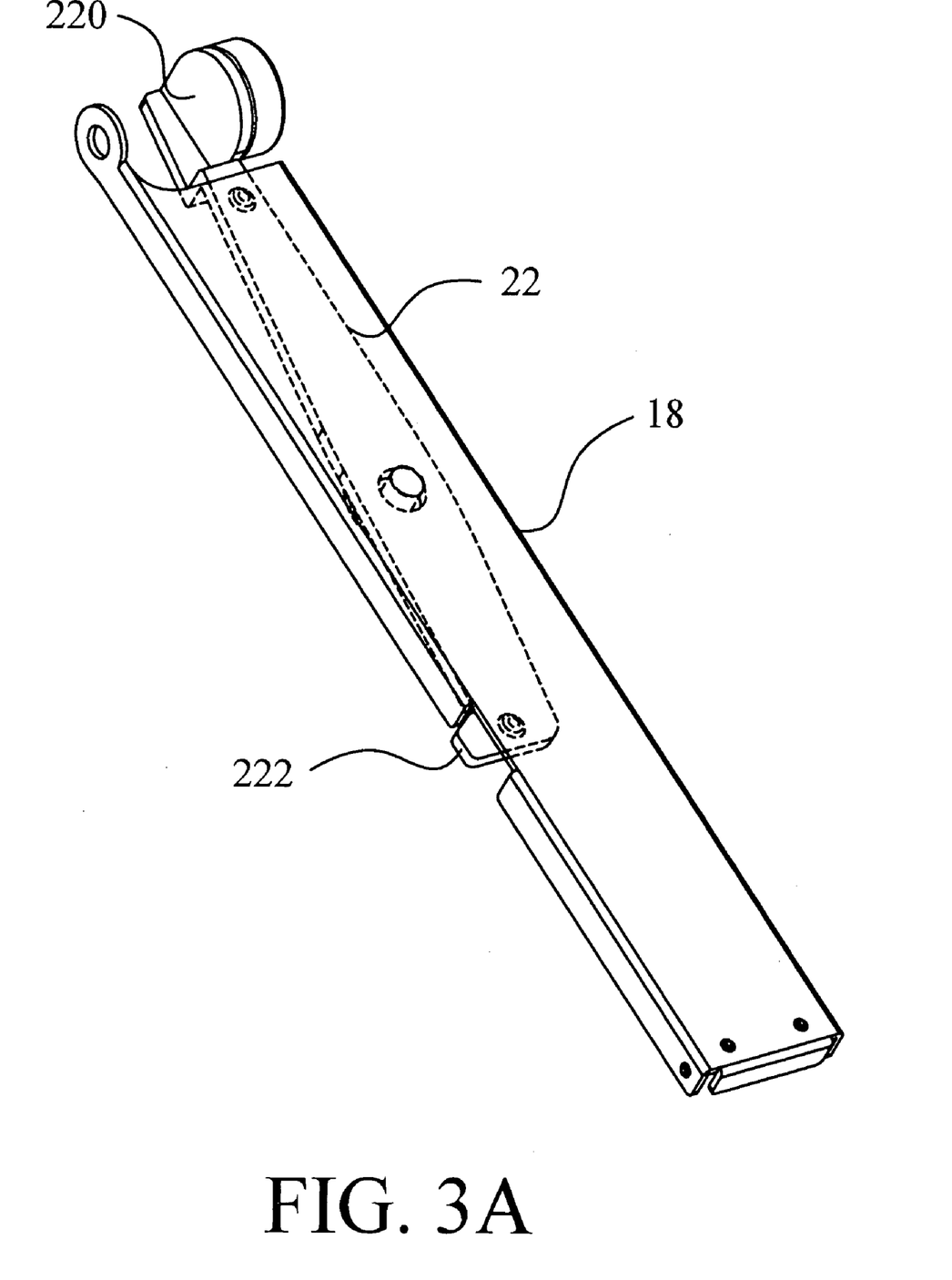
FIG. 3A is a zoom-in view illustrating the first hollow member and the first push bar in FIG. 2.

Please refer to FIG. 3A and FIG. 3B. FIG. 3A is a zoom-in view illustrating the first hollow member 18 and the first push bar 22 in FIG. 2. FIG. 3B is a zoom-in view illustrating the second hollow member 20 and the second push bar 22 in FIG. 2. As shown in FIG. 3A, the first push bar 22 can be inserted through and rotatably mounted in the first hollow member 18. The first push bar 22 has a first pushed portion 220 exposed outside the first hollow member 18, and has a first retained portion 222 disposed inside the first sleeve 14. The first retained portion 222 is retained by one of the first retaining portions 142, as shown in FIG. 2.

Figure 3B:
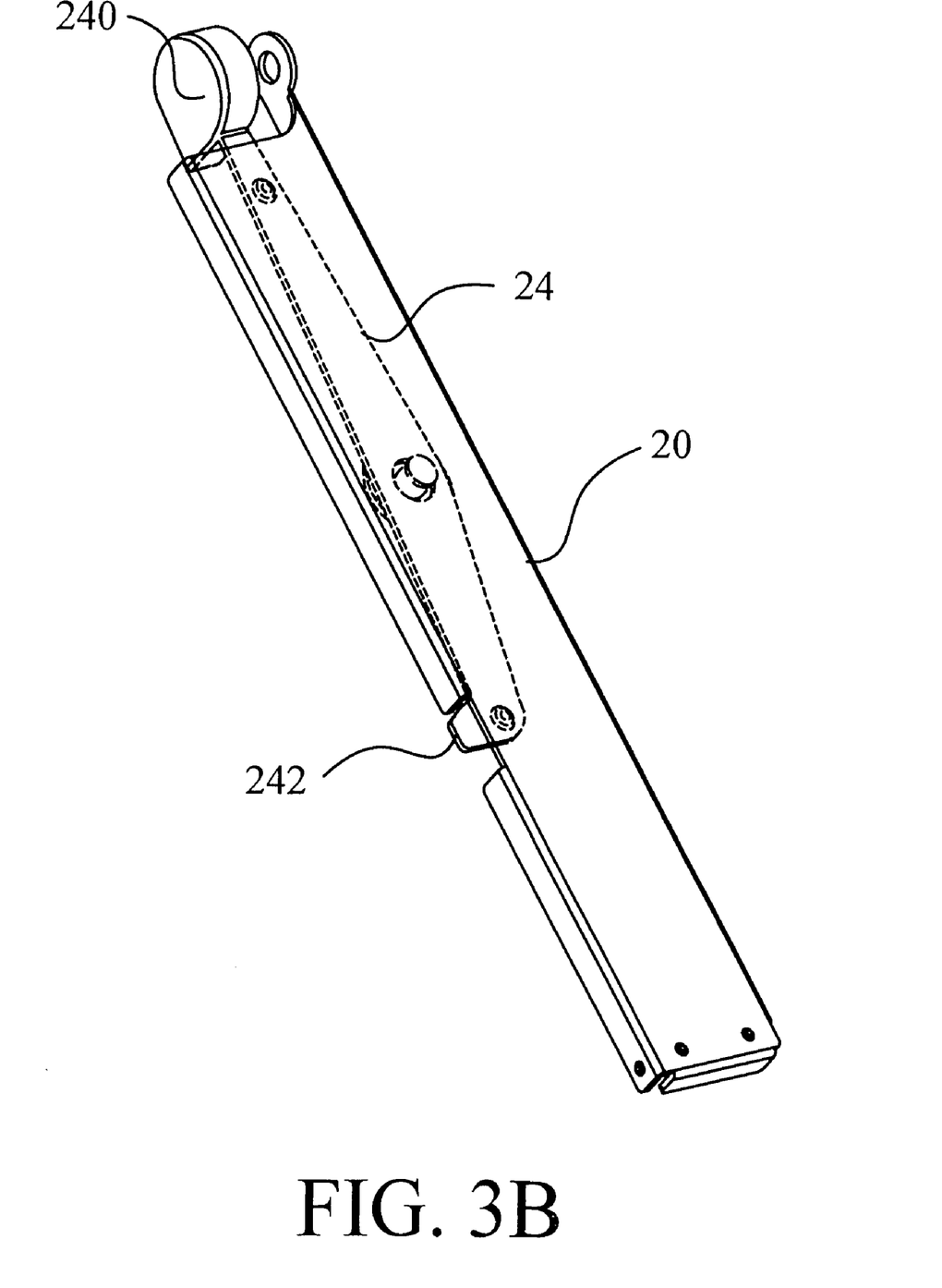
FIG. 3B is a zoom-in view illustrating the second hollow member and the second push bar in FIG. 2.

As shown in FIG. 3B, the second push bar 24 can be inserted through and rotatably mounted in the second hollow member 20. The second push bar 24 has a second pushed portion 240 exposed outside the second hollow member 20, and has a second retained portion 242 disposed inside the second sleeve 16. The second retained portion 242 is retained by the second retaining portion 162 corresponding to the first retaining portion 142, as shown in FIG. 2.

In a practical application, the first retained portion 222 is retained by the first retaining portion 142, and the second retained portion 222 is retained by the second retaining portion 162 corresponding to the first retaining portion 142. At this time, the display panel 12 can be supported by a supporting force provided by the retained portions 222 and 242, cooperated with the retaining portions 142 and 162. The supporting force is able to support the display panel 12 firmly, so as to provide facility to the user when operating.

As shown in FIG. 2, the user-operable activating member 26 can be movably mounted on the rear portion 122 of the display panel 12. In a practical application, the user-operable activating member 26 includes an operable portion 260 made into, but not limited to, a form of a knob.

Figure 4A:
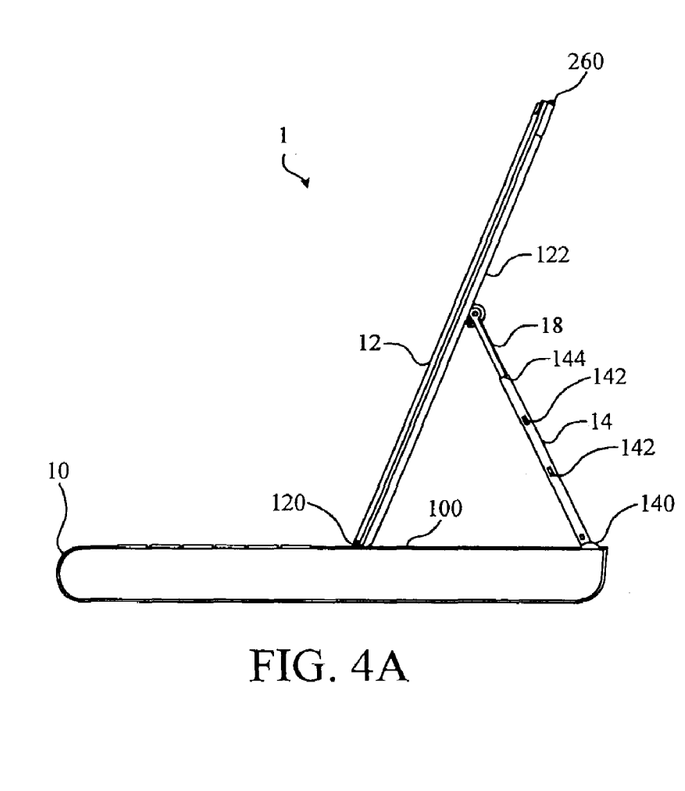
FIG. 4A and FIG. 4B are schematic diagram illustrating the rotation of the display panel of the portable electronic apparatus in FIG. 1.
Figure 4B:
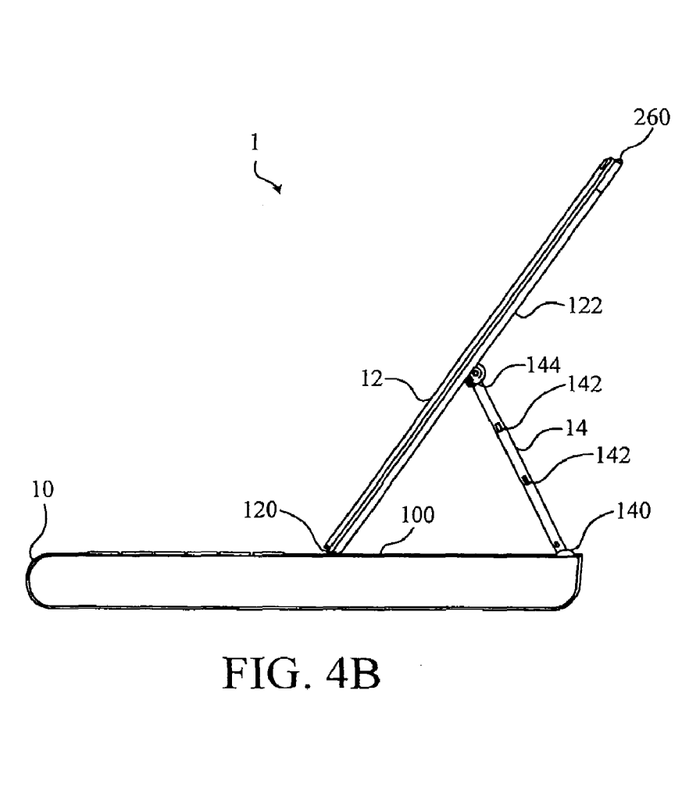

Please refer to FIG. 4A and FIG. 4B. FIG. 4A and FIG. 4B are schematic diagram illustrating the rotation of the display panel 12 of the portable electronic apparatus 1 in FIG. 1. In a practical application, when the user-operable activating member 26 is operated to activate the first pushed portion 220 and the second pushed portion 240 in an escaping direction D1, the first retained portion 222 will escape from said one first retaining portion 142, and the second retained portion 222 will escape from the second retaining portion 162 corresponding to said one first retaining portion 142, as shown in FIG. 2. At the same time, the display panel 12 can be operated to rotate and lift or lower with respect to the housing 10, and the user can rotates the display panel 12 to a proper angle according to the practical application, as shown in FIG. 4A and FIG. 4B.

Subsequently, the activating member 26 will be turned back so that the first retained portion 222 is retained by another one of the first retaining portions 142. At the same time, the second retained portion 242 will be retained by another second retaining portion 162 corresponding to the another one of the first retaining portions 142.

Figure 5A:
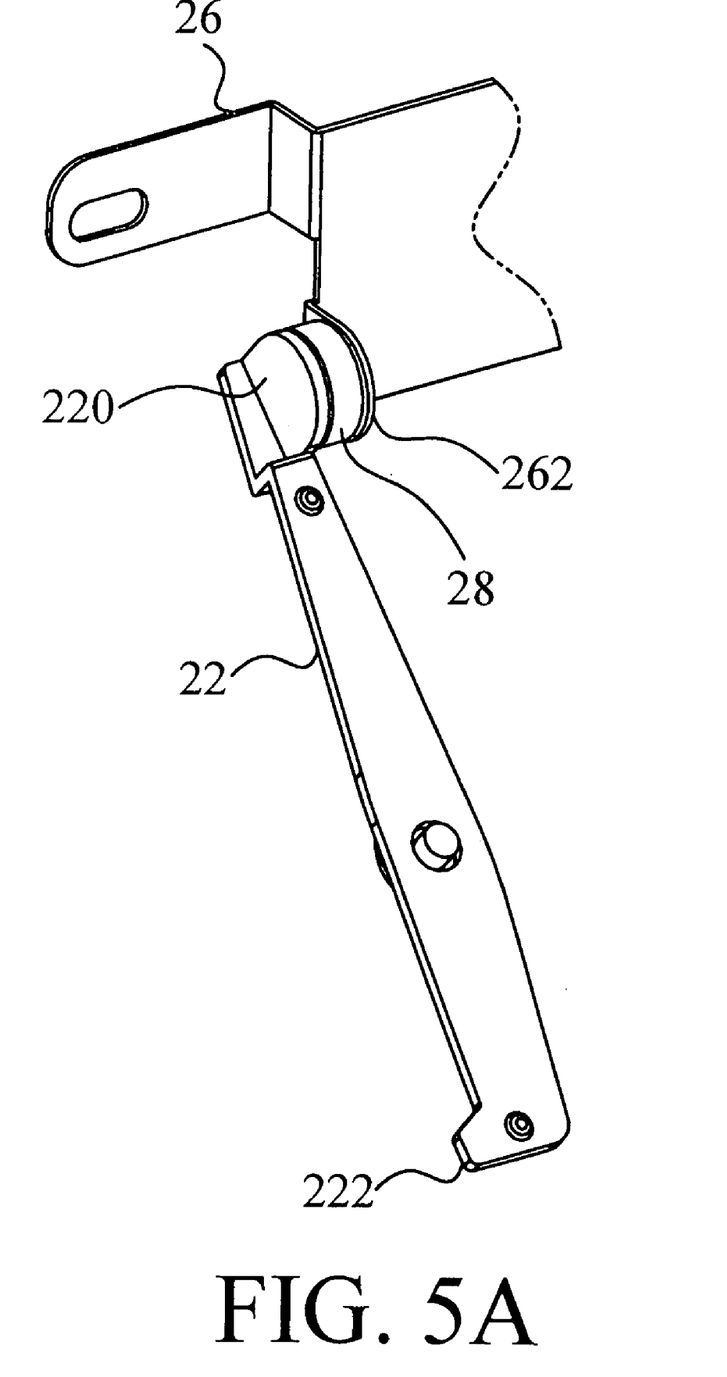
FIG. 5A is a section view illustrating the first push bar and the user-operable activating member in FIG. 2.

Please refer to FIG. 5A. FIG. 5A is a section view illustrating the first push bar 22 and the user-operable activating member 26 in FIG. 2. In a practical application, the user-operable activating member 26 can include a first pushing portion 262. The portable electronic apparatus 1 can include a first magnetic device 28.

The first pushing portion 262 can be formed of a ferromagnetic material, and the first magnetic device 28 can be attached on the first pushed portion 220 of the first push bar 22. Thus, a magnetic force is induced between the first pushing portion 262 and the first magnetic device 28 whereby the user-operable activating member 26 can turn back.

Or, the first magnetic device 28 can be attached on the first pushing portion 262, and the first pushed portion 220 of the first push bar 22 can be formed of a ferromagnetic material. Thus, a magnetic force is induced between the first magnetic device 28 and the first pushed portion 220 whereby the user-operable activating member 26 can turn back.

Figure 5B:
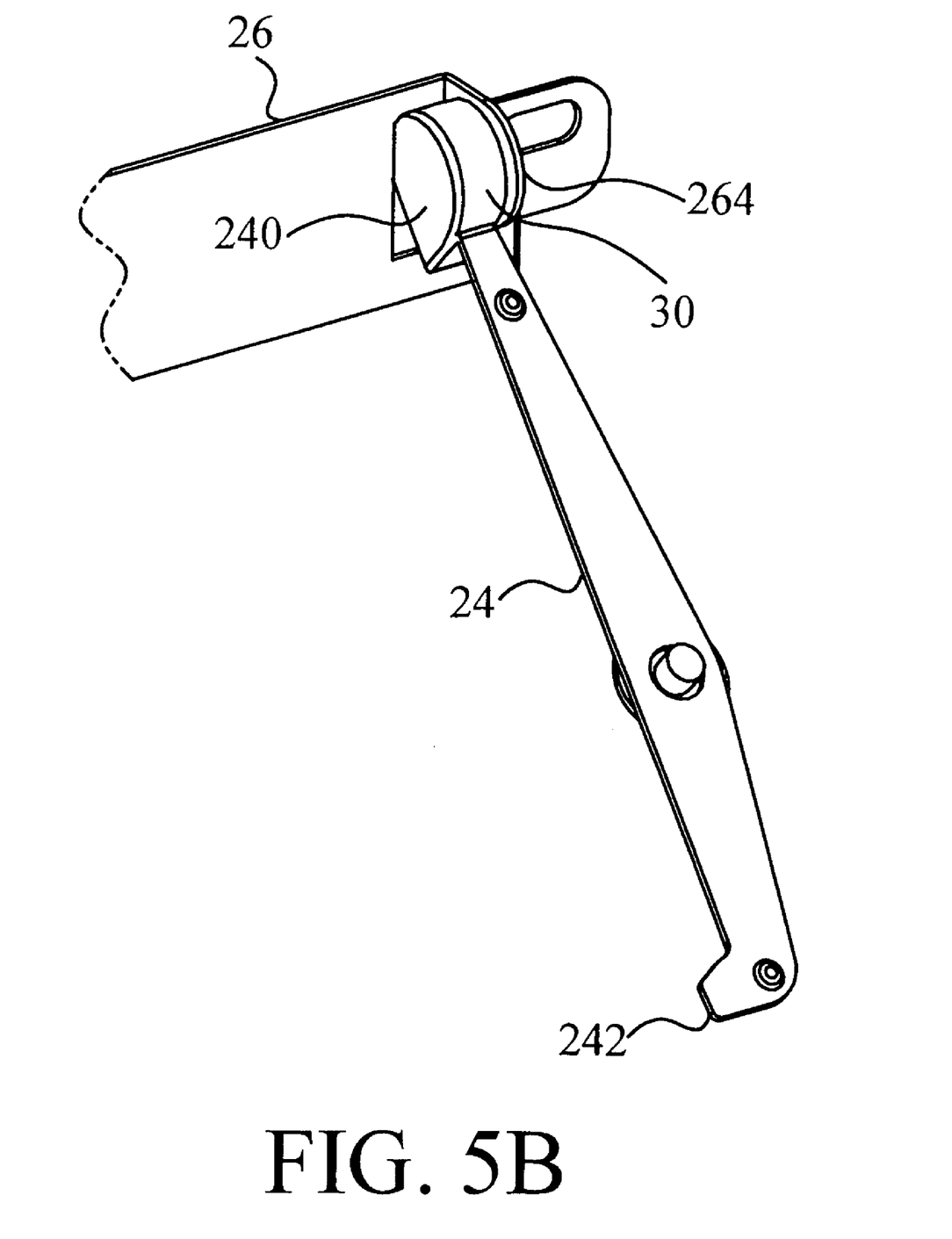
FIG. 5B is a section view of the second push bar and the user-operable activating member in FIG. 2.

Please refer to FIG. 5B. FIG. 5B is a section view of the second push bar 24 and the user-operable activating member 26 in FIG. 2. In a practical application, the user-operable activating member 26 can include a second pushing portion 264. The portable electronic apparatus 1 can include a second magnetic device 30.

The second pushing portion 264 can be formed of a ferromagnetic material, and the second magnetic device 30 can be attached on the second pushed portion 240 of the second push bar 24. Thus, a magnetic force is induced between the second pushing portion 264 and the second magnetic device 30 whereby the user-operable activating member 26 can turn back.

Or, the second magnetic device 30 can be attached on the second pushing portion 264, and the second pushed portion 240 of the second push bar 24 can be formed of a ferromagnetic material. Thus, a magnetic force is induced between the second magnetic device 30 and the second pushed portion 240 whereby the user-operable activating member 26 can turn back.

Figure 6:
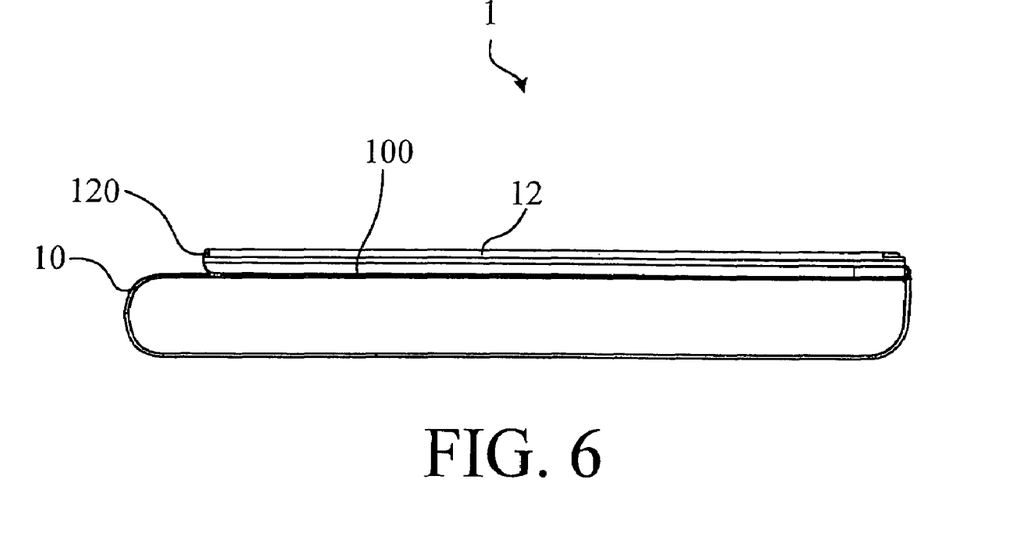
FIG. 6 is an appearance view illustrating that the display panel is closed with respect to the housing in FIG. 1.

Please refer to FIG. 6. FIG. 6 is an appearance view illustrating that the display panel 12 is closed with respect to the housing 10 in FIG. 1. In a practical application, the portable electronic apparatus 1 can further include a user-operable input device 32 disposed on the housing 10, such as a keyboard shown in FIG. 1. When the first retained portion 222 is retained by the lowest first retaining portion 142 among the first retaining portions 142, and the second retained portion 242 is retained by the lowest second retaining portion 162 corresponding to the lowest first retaining portion 142, the display panel 12 can be closed with respect to the housing 10 to cover the user-operable input device 32. Thus, when the user does not need to use the user-operable input device 32, the user can easily close the display panel 12 and cover the user-operable input device 32.

Compared with the prior arts, the portable electronic apparatus 1 according to the invention uses a retained portion cooperated with a plurality of retaining portions (like a recess) to support the display panel. Thereby, the display panel of the portable electronic apparatus can be adjusted to a plurality of angles so as to adapt to real conditions, such as angles of light source, operational behaviors of users and the like, and enhance the utility of the portable electronic apparatus. Moreover, because the supporting force provided by the retained portion and the retaining portions is larger than the pressing force by a user while operating display panel, the retained portion and the retaining portions is capable of supporting the display panel firmly during operation, so that the user operates conveniently. Furthermore, since the user only has to operate knobs to adjust the angle of the display panel easily without complex operation processes, it is convenient to the user.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A portable electronic apparatus comprising:
   a housing;
   a display panel, a bottom edge of the display panel being slidably engaged to a top portion of the housing;
   a first sleeve, a tail end of the first sleeve being pivotally engaged to the top portion of the housing, the first sleeve therein providing N first retaining portions, N being an integer larger than 1;
   a first hollow member, pivotally engaged to a rear portion of the display panel and adapted to be inserted into the first sleeve from an open end of the first sleeve;
   a first push bar, inserted through and rotatably mounted in the first hollow member, the first push bar having a first pushed portion exposed outside the first hollow member, and having a first retained portion disposed inside the first sleeve and retained by one of the first retaining portions; and
   a user-operable activating member, movably mounted on the rear portion of the display panel;
   wherein the user-operable activating member is operated to activate the first pushed portion of the first push bar, such that the first retained portion escapes from said one first retaining portion, the display panel is operated to rotate and lift or lower with respect to the housing, and then the activating member is turned back so that the first retained portion is retained by another one of the first retaining portions.

2. The portable electronic apparatus of claim 1, wherein each of the first retaining portions is a recess formed in the first sleeve.

3. The portable electronic apparatus of claim 1, wherein the first retaining portions are made into a form of a rack.

4. The portable electronic apparatus of claim 1, wherein the user-operable activating member comprises an operable portion made into a form of a knob.

5. The portable electronic apparatus of claim 1, wherein the user-operable activating member comprises a first pushing portion formed of a ferromagnetic material, the portable electronic apparatus further comprises a first magnetic device attached on the first pushed portion of the first push bar, a magnetic force is induced between the first pushing portion and the first magnetic device, and the magnetic force assists the user-operable activating member in turning back.

6. The portable electronic apparatus of claim 1, wherein the user-operable activating member comprises a first pushing portion on which a first magnetic device is attached, the first pushed portion of the first push bar is formed of a ferromagnetic material, a magnetic force is induced between the first magnetic device and the first pushed portion, and the magnetic force assists the user-operable activating member in turning back.

7. The portable electronic apparatus of claim 1, further comprising a user-operable input device disposed on the housing, wherein when the first retained portion is retained by the lowest first retaining portion among the first retaining portions, the display panel is closed with respect to the housing to cover the user-operable input device.

8. The portable electronic apparatus of claim 1, further comprising:
   a second sleeve, a tail end of the second sleeve being pivotally engaged to the top portion of the display panel, the second sleeve therein providing N second retaining portions which each corresponds to one of the first retaining portions;
   a second hollow member, pivotally engaged to the rear portion of the display panel and adapted to be inserted into the second sleeve from an open end of the second sleeve; and
   a second push bar, inserted through and rotatably mounted in the second hollow member, the second push bar having a second pushed portion exposed outside the second hollow member, and having a second retained portion disposed inside the second sleeve and retained by the second retaining portion corresponding to said one first retaining portion;
   wherein the user-operable activating member is operated to activate the first pushed portion and the second pushed portion at the same time, such that the second retained portion escapes from the second retaining portion corresponding to said one first retaining portion and the second retained portion is retained by the second retaining portion corresponding to said another one first retaining portion when the user-operable activating member is turned back.

9. The portable electronic apparatus of claim 8, wherein each of the second retaining portions is a recess formed in the second sleeve.

10. The portable electronic apparatus of claim 8, wherein the second retaining portions are made into a form of a rack.

11. The portable electronic apparatus of claim 8, wherein the user-operable activating member comprises an operable portion made into a form of a knob.

12. The portable electronic apparatus of claim 8, wherein the user-operable activating member comprises a second pushing portion formed of a ferromagnetic material, the portable electronic apparatus further comprises a second magnetic device attached on the second pushed portion of the second push bar, a magnetic force is induced between the second pushing portion and the second magnetic device, and the magnetic force assists the user-operable activating member in turning back.

13. The portable electronic apparatus of claim 8, wherein the user-operable activating member comprises a second pushing portion on which a second magnetic device is attached, the second pushed portion of the second push bar is formed of a ferromagnetic material, a magnetic force is induced between the second magnetic device and the second pushed portion, and the magnetic force assists the user-operable activating member in turning back.

* * * * *